US008088192B2

(12) United States Patent
Roth et al.

(10) Patent No.: US 8,088,192 B2
(45) Date of Patent: Jan. 3, 2012

(54) RECOVERY OF RESIDUES CONTAINING COPPER AND OTHER VALUABLE METALS

(75) Inventors: Jean-Luc Roth, Thionville (FR); Christophe Solver, Luxembourg (LU)

(73) Assignee: Paul Wurth S.A., Luxembourg (LU)

( * ) Notice: Subject to any disclaimer, the term of this patent is extended or adjusted under 35 U.S.C. 154(b) by 4 days.

(21) Appl. No.: 12/738,654

(22) PCT Filed: Oct. 10, 2008

(86) PCT No.: PCT/EP2008/063628
§ 371 (c)(1),
(2), (4) Date: Apr. 19, 2010

(87) PCT Pub. No.: WO2009/050119
PCT Pub. Date: Apr. 23, 2009

(65) Prior Publication Data
US 2010/0242676 A1    Sep. 30, 2010

(30) Foreign Application Priority Data

Oct. 19, 2007   (EP) .................................... 07118915

(51) Int. Cl.
*C22B 7/00*   (2006.01)
*C22B 7/02*   (2006.01)
(52) U.S. Cl. ..................... 75/10.19; 75/10.45; 75/10.62; 75/641; 75/961
(58) Field of Classification Search ................. 75/10.19, 75/641, 10.62, 10.45, 961
See application file for complete search history.

(56) References Cited

U.S. PATENT DOCUMENTS 4,110,107 A    8/1978    Paulson
4,737,186 A    4/1988    Krogerus

FOREIGN PATENT DOCUMENTS

AU    2055395    12/1995
GB    1458269    12/1976
WO    2006131372 A1    12/2006

OTHER PUBLICATIONS

International Search Report PCT/EP2008/063628; Dated Jan. 20, 2009.
International Search Report issued Jan. 20, 2009 by European Patent Office re: PCT/PCT/EP2008/063628; US 4,110,107 A, AU 697 503 B2 and WO 2006/131372 A1.
R.T. Jones, et al., "Recovery of Colbalt, Nickel, and Copper from Slags, using DC-ARC Furnace Technology", International Symposium on Challenges of Process Intesification, 35th Annual Conference of Metallurgists, Aug. 24-26, 1996, pp. 451-466, online at www.mintek.co.za/Pyromet/Colbalt/Colbalt.htm, Montreal, Canada.
J. Kunze, et al., "Current Status and New Trends in Copper Slag Cleaning", 5th International Conference Copper 2003, Santiago, Chile, Nov. 30 -Dec. 3, 2003, pp. 459-473, vol. IV—Pyrometallurgy of Copper (Book 1).

*Primary Examiner* — George Wyszomierski
*Assistant Examiner* — Tima M McGuthry Banks
(74) *Attorney, Agent, or Firm* — Cantor Colburn LLP

(57) ABSTRACT

A process for recovering non-ferrous metals, in particular copper, nickel and cobalt, from metallurgical residues containing these non-ferrous metals at an oxidation state of greater than or equal to zero, in an alternating current type plasma arc electric furnace comprising a plurality of electrodes, containing a liquid copper heel covered by a fluid slag comprising at least one fusion-reduction phase, comprising charging of metallurgical residues comprising the non-ferrous metals onto the heel contained in the plasma arc electric furnace, fusion of the metallurgical residues in the fluid slag or at the slag-metal bath interface, reduction of at least the non-ferrous metals to oxidation state zero, and intense stirring of the copper heel by injection of inert gas, preferably nitrogen and/or argon, so as to avoid crust formation and to accelerate the reduction reaction and to cause the copper-miscible non-ferrous metals to pass into the copper heel.

18 Claims, No Drawings

RECOVERY OF RESIDUES CONTAINING COPPER AND OTHER VALUABLE METALS

TECHNICAL FIELD

The present invention relates to a process for the recovery of residues containing copper and other valuable metals, in particular nickel, molybdenum, cobalt, etc.

BACKGROUND

The increase in the price of copper (Cu) and in the value of alloy metals such as in particular nickel (Ni), cobalt (Co) and molybdenum (Mo) has led copper smelters to develop complementary steps for treating slag prior to dumping.

This is because processes for smelting Cu from ore concentrates generally give rise to copper matte, on the one hand, which is refined, and on the other hand to slag or cinder resembling gangue, composed primarily of silica, iron oxides, and other "non-reducible" oxides (alumina, magnesium, lime). This slag contains low contents of copper and other reducible metals, such as molybdenum, nickel, cobalt etc., which have hitherto been only partially recovered, either by a physical method, namely very fine grinding of the slag and separation of the phases containing copper by flotation, or by a slag reduction treatment in an electric furnace.

In practice, copper smelting plants have always left behind and dumped a low-grade fraction still containing 0.5 to 2% of copper and contents of the order of 0.5% of Mo, Ni or Co which vary as a function of the mineralogical nature of the concentrate.

A typical analysis of slag originating from smelters is presented in Table 1 below:

TABLE 1

Cu smelter slag

| Element/compound | Unit | Content |
|---|---|---|
| Total Cu | % | 0.7~1.6 |
| Fe | % | 44~47 |
| Mo | % | 0~0.6 |
| Zn | % | 1~5 |
| S | % | 0.2~0.8 |
| $SiO_2$ | % | 24~29 |
| $Fe_3O_4$ | % | 4~11 |
| CaO | % | 1~2 |
| $Al_2O_3$ | % | 2~3 |

Slag of a comparable composition (also containing Cu) is obtained from metallurgical processing of lead, after the steps of extraction by volatilisation ("fuming") of the volatile metals, mainly Pb and Zn.

The composition of this slag is summarised in Table 2 below:

TABLE 2

Pb "fuming" slag

| Element/compound | Unit | Content |
|---|---|---|
| Total Cu | % | 1~2 |
| Fe (as FeO) | % | 20~35 |
| $SiO_2$ | % | 30~40 |
| CaO | % | 15~20 |
| $Al_2O_3$ | % | 3~7 |
| Zn | % | 0~1 |
| Pb | % | <0.1 |

Furthermore, electrochemical smelting of copper (anode furnaces) gives rise to slag known as copper-iron slag, of the following (indicative) composition (Table 3):

TABLE 3

Cu—Fe slag

| Element/compound | Unit | Content |
|---|---|---|
| Total Cu | % | 5~10 |
| Fe | % | 25~35 |
| Sn | % | 1~2 |
| Ni | % | 0~1 |
| Cr | % | 0~3 |
| S | % | 0.1~0.2 |
| $SiO_2$ | % | 10~30 |
| CaO | % | 5~15 |
| $Al_2O_3$ | % | 2~6 |
| MgO | % | 2~4 |
| Zn | % | 0~10 |
| Pb | % | 0~2 |

In known recovery processes, the recovery step is performed in a treatment or purifying ("slag cleaning") furnace, the most recent version of which is an electric furnace of the SAF ("Submerged Arc Furnace") furnace type, in which heating does not in fact take place by electrical arc but instead by current conduction (Joule effect) in the slag; this is why this furnace is sometimes known as a "slag resistance" furnace.

The technology and operation of this type of furnace is described in the article "Current status and new trends in copper slag cleaning" in the publication "COPPER 2003-COBRE 2003".

In industrial practice, these furnaces process several types of smelting coproducts, but mainly converter slags which are liquid and contain 5 to 10% Cu (mainly as the oxide $Cu_2O$ and the sulfide $Cu_2S$), and, in small proportions, "copper scraps" which are cold and therefore solid and contain 30 to 40% Cu. The other dominant compounds are iron (as oxides FeO and $Fe_3O_4$) and silica $SiO_2$.

The operation is performed at a temperature of the order of 1250° C. and involves reducing Cu oxides using gaseous CO or metallic iron, themselves formed through the addition of carbon to the slag.

The products obtained are a Cu—Fe—S matte containing 50 to 70% of copper, and thus a considerable proportion of iron, and a residual slag of the composition stated above ("Cu smelter slag").

This result is unsatisfactory for 2 reasons:
- on the one hand, the copper matte is greatly diluted by iron and sulfur, and
- on the other hand, the final slag still contains significant contents of Cu, Mo and Zn, which will not therefore be recovered.

A publication by MINTEK, entitled "Recovery of cobalt, nickel, and copper from slags, using DC-arc furnace technology" presents the results of tests carried out on various direct current-powered pilot arc furnaces (60 kW, 150 kW, 1-3 MW) involving fusion of slag from reverberatory furnaces containing 1 to 3% Cu, 0 to 4% Ni, 0 to 1% Co.

The tests were carried out at temperatures of between 1300 and 1600° C. and reduction was performed using carbon as the primary reducing agent.

The alloys obtained comprised 40% to 80% Fe, and the main findings obtained from the tests were as follows:
- cobalt and copper are more difficult to recover than nickel,
- recovery yields for Cu and Co are principally a function of the proportion of iron in the poured metal and of the duration of the operation, with durations of the order of 2 h making it possible to minimise residual contents of Cu, Ni and Co in the slag, and for iron contents of 50% in the metal, the residual contents observed are of the order of 0.5% Cu, and of 0.1% for Ni and Co, these figures resulting from initial contents 5 to 10 times higher for Ni and Cu, which confirms that Ni is recovered with the best yield.

The study further cites the possibility of concentrating the Cu and Co alloy by injection of oxygen, making it possible to reduce the content of Fe to 25%, and the possibility of improving the recovery yields of the valuable elements by application of "mild stirring", for which no figures are given.

The authors explain that plasma arc heating makes it possible to obtain better recovery yields than in a slag resistance furnace (mentioned above), because the chemical composition of the slag may be adjusted independently of the slag resistance feature (which requires elevated Fe contents); however, the comparison is limited to the AC (alternating current) electric furnace variant of the SAF type relative to the DC-type plasma arc furnace.

Finally, they mention prior publications which have demonstrated that the addition of lime (CaO) accelerates reduction kinetics and makes it possible to obtain good recovery yields after as little as 1 h of operation.

In 1994, MINTEK filed a patent based on this principle of reduction using carbon in a DC (direct current) arc furnace.

It should be noted that there are a number of old patents (1972 to 1988) which propose Cu "smelter" slag reduction processes using an electric furnace, under very specific conditions:

a 1972 patent (DE 2122169, Vereinigte Deutsche Metallwerke) using CaSi fines and very particular temperature conditions (>1700° C.), a 1976 patent (GB 1458269, Kennecott Copper) using as reducing agent iron sulfide at 1200-1300° C. or a carbon-containing reducing agent, introduced with intense mechanical stirring in order ultimately to form a matte, and a 1988 patent (US 4737186, Outokumpu) relating to the reduction of a Pb, Cu and/or Ni slag using carbon dust, but on a very thin metal bath (thickness less than 20 mm), which involves the SAF-type mode of operation (resistive slag).

Consequently, none of the hitherto proposed solutions allows satisfactory recovery of valuable metals, either with regard to the nature of the raw materials which may be used and the yield of the recovered metals, or with regard to the technical and economic aspects of the process itself.

BRIEF SUMMARY

The disclosure proposes an efficient process allowing these various types of slag to be treated in order to extract at least some of the valuable metals contained therein, for example Cu, Ni, Mo, Co, Zn, Pb, in highly recoverable forms.

According to the invention, this is achieved by a process for recovering valuable non-ferrous metals.

The invention proposes a process for recovering non-ferrous metals, in particular copper, nickel and cobalt, from metallurgical residues containing these non-ferrous metals at an oxidation state of greater than or equal to zero, in a plasma arc electric furnace of the alternating current type comprising a plurality of electrodes, equipped with a refractory hearth and containing a liquid copper heel, covered by a fluid slag comprising at least one fusion-reduction phase A, comprising the following elements:

A1 charging metallurgical residues comprising non-ferrous metals onto the heel contained in the plasma arc electric furnace, A2 fusion of the metallurgical residues in the fluid slag at the slag/copper bath interface, A3 reduction of at least the non-ferrous metals to oxidation state zero (as metal), and A4 intense stirring of the copper heel by injection of inert gas, preferably nitrogen and/or argon, so as to avoid crust formation, to accelerate the reduction reaction and to cause the copper-miscible non-ferrous metals to pass into the copper heel.

Using a copper bath in combination with an alternating current type plasma arc furnace is particularly advantageous for several reasons.

Firstly, this recovery process makes it possible make use of a combination of standard items of equipment (electric furnace, charging device, bath stirrer) which are used in the present case under specific operating conditions.

Moreover, this combination makes it possible to use metallurgical residues, which are most frequently slag, cinder or dust originating from all kinds of metallurgical processes, obtained both during smelting and during refining, but also possibly originating from any other appropriate source, for example during processing or machining of metals and alloys, and which may comprise a large number of different valuable non-ferrous metals, such for example Ni, Co, Mo, Zn, Pb, As, Al etc., even at relatively low contents at the outset.

On the other hand, unlike slag resistance processes, the present process is basically insensitive to the composition of the metallurgical residues used which will determine the composition of the slag. This allows very great flexibility in the treatment in terms of the origin and the nature of the metallurgical residues. In particular, the presence of other compounds which are not of interest from the standpoint of recovery, such as for example silicon, magnesium, calcium etc., does not have a negative impact on the operation of the present process.

It should be noted that the metallurgical residues usable in such a process may be cold and thus solid, but hot or even molten residues, for example originating directly from a metallurgical process, as in the case of Cu smelters, may also be charged.

In a preferred embodiment of the process, reduction is carried out in the presence of lime (calcium oxide, CaO). This is because lime accelerates the kinetics of reduction reactions and makes it possible to obtain good recovery yields after shorter treatment times.

The metallurgical residues and optionally lime are preferably charged into the electric furnace between the electrodes of the plasma arc electric furnace. Alternatively, the metallurgical residues and lime are charged through an opening in the arc furnace roof. This opening, equipped with a chute, is then located close to the perimeter of the electrode circle, the chute being inclined such that, on dropping down, the material passes between the electrodes into the heel.

The metallurgical residues and the lime are simultaneously or alternately charged into the electric furnace, preferably by gravity.

If desired, it is of course also possible to add supplementary slag-forming agents during phase A and/or C.

Intense stirring of the heel makes it possible to achieve a uniform temperature of the heel and the slag; constantly to renew the layer of slag in contact with the heel so that it remains superheated and highly liquid and capable of absorbing the valuable non-ferrous metals without the latter solidifying and then forming an unbreakable crust. This is because, at the moment of impact of the residues on the slag, they are directly digested by the furnace medium and fuse very rapidly thanks to the vigorous stirring.

This intense stirring of the heel may be brought about by injection of neutral or inert gas (nitrogen and/or argon) through the hearth of the electric arc furnace at gas flow rates of preferably between 40 l/min·t (liters per minute and per tonne of liquid metal in the bath) and 150 l/min·t (liters per minute and per tonne of liquid metal in the bath). Particularly preferably, the flow rate of the stirring gas is between 50 and 100 l/min·t (liters per minute and per tonne of liquid metal in the bath). Of course, these flow rates need to be adjusted depending on the depth of the heel together with the number and position of injection points. These elevated stirring gas flow rates bear no relation to ordinary practice for electric arc furnaces. Indeed, the flow rate of stirring gas in conventional steel production processes in an electric arc furnace is in the range from 0.1 to 5 l/min·t and is intended only to homogenise the heel and to regulate the metallurgical results and temperature.

To ensure optimum effectiveness of stirring, the metal heel must have a certain minimum depth, preferably a depth of at least 0.3 m. Care must be taken to ensure that injection of the stirring gas through the furnace hearth does not simply punch a "hole" through the metal bath without setting it into vigorous motion. Of course, this minimum depth may vary depending on the configuration of the electric arc furnace and the location of the gas injection means which are preferably porous bricks or alternatively tuyères.

So as to ensure complete reduction of the valuable metals even in the presence of metallic reducing agents in the metallurgical residues, reduction is preferably carried out in the presence of carbon, preferably anthracite. To this end, carbon is injected into the copper bath in order to ensure a sufficient carbon content in the bath.

Another advantage of the process according to the invention is that certain non-ferrous compounds are volatilised during phase A and carried away by the fumes. Consequently, in an advantageous embodiment of the invention, the process furthermore provides for recovery of volatile heavy metals, in particular zinc and lead, in which the volatile heavy metal compounds carried away in the fumes during phase A and, if applicable, phase B, are recovered by means of separators, for example by means of a filter.

So as to optimise extraction of the metal droplets from the slag in the copper bath, one embodiment provides a settling phase B following the at least one fusion-reduction phase comprising moderate stirring B1 which promotes settling of the metal droplets metallic from the slag into the heel.

This moderate stirring of the heel in step B1 is carried out by injection of inert gas through the hearth of the electric arc furnace at a flow rate of between 2 l/min·t and 20 l/min·t and preferably at a flow rate of between 3 and 10 l/min·t.

Since phase A and optionally phase B may be repeated and the effective volume of the furnace is limited, it is advantageous to remove a proportion, preferably a large proportion, of the slag depleted in valuable metals from the furnace so as to be able to introduce a new charge of metallurgical residues. So as to avoid the metal droplets suspended in the slag being eliminated with the slag, the process preferably provides that removal of at least a proportion of the slag from the furnace is preceded by a settling phase by means of moderate stirring.

The copper bath is particularly advantageous for recovering a certain number of non-ferrous metals after reduction to oxidation state zero, i.e. as metal, such as in particular nickel and cobalt, but also other metals, such as molybdenum. If it is desired to achieve a good recovery yield of these non-ferrous metals, it is, however, difficult to avoid reducing a certain quantity of iron which will consequently also pass into copper bath.

However, since the presence of iron in the copper bath is generally not desired, one advantageous embodiment furthermore proposes eliminating iron and metals more highly oxidisable than iron which are optionally present from the copper bath, said process furthermore comprising at least one subsequent oxidation phase C involving oxidation of the iron and of the metals more highly oxidisable than iron, in particular silicon, manganese or aluminium, in the copper bath by injection of oxygen into the copper bath while applying or maintaining intense stirring from beneath.

The particular advantage of this embodiment is consequently not only of purifying the copper bath in order to obtain copper containing substantially no iron but furthermore in particular containing nickel and cobalt. Such a copper alloy may be a raw material of interest for certain copper applications.

Should the metallurgical residues used contain molybdenum, since the latter is less miscible with copper than is nickel or cobalt for example, the present invention proposes one particularly advantageous variant of the process which permits selective recovery of a molybdenum oxide concentrate. In such a case, the oxidation phase C is performed after removal B2 of at least a proportion of the slag and with a quantity of oxygen amounting to 1.2 to 1.8 times the stoichiometric quantity for oxidation of the iron and the molybdenum contained in the copper bath, and the molybdenum oxide carried away in the This separator is preferably separate from the one optionally used during phase A to recover Zn and Pb. The molybdenum oxide obtained is relatively concentrated and may, if necessary, readily be further purified by known means.

Since, during the oxidation phase with an excess of oxidising agent, a proportion of the copper is inevitably oxidised and carried over into the slag, it is advantageous to remove a proportion of the depleted slag before phase C and to recycle the copper-enriched slag to a subsequent fusion-reduction phase A.

Consequently, a proportion of the copper bath is advantageously removed from the furnace on completion of phase C, while the slag is recycled to a subsequent fusion-reduction phase A.

On the other hand, in the light of the lower miscibility of molybdenum in copper, it may be advantageous to carry out oxidation phase C more frequently depending on the Mo content in the starting metallurgical residues, for example after each phase A preferably combined with a phase B.

The treatment temperatures used during phase A, phase B and phase C are generally between 1300 and 1600° C., but preferably between 1400 and 1500° C.

In summary, thanks to a process such as that described above, it is possible to recover metallurgical residues of various origins containing non-ferrous metals. In its simplest form, such a process makes it possible to obtain a metallic alloy of Cu containing Ni and Co, and, if applicable, Mo with a low iron content. Advantageously in this case, the volatile metallic fractions, in particular Zn, Pb, As, Bi, Sb, etc., together with any precious metals possibly present (for example Ag, In, Ge, etc.), are recovered as dusts in a filter.

Advantageously, the process comprises a settling phase by means of moderate stirring of the copper bath in order to make it possible to recover metal droplets into the bath.

In a more preferred process, an oxidation phase not only makes it possible to eliminate iron from the copper alloy, but also to recover molybdenum by filtration of the fumes.

Other distinctive features and characteristics of the invention will be revealed by the detailed description of some advantageous embodiments given below by way of example.

DETAILED DESCRIPTION

In principle, the proposed solution involves a pyrometallurgical process carried out in an AC (alternating current) type plasma arc furnace on a copper bath which is strongly mixed by injection of inert gas (nitrogen or argon).

A. Fusion-Reduction Phase
  charging of the slag (and of the other possible residues) to be treated and adjustment to temperature (fusion if cold charging) by heating and intense stirring in contact with the copper bath;
  a reducing step making it possible to cause virtually the entirety of the elements Cu, Mo, Ni, and Co to pass from the slag into the metal; at the end of this reducing step, a slag greatly depleted in valuable elements is poured, so explaining the very good yields of Cu, Ni, Co and likewise Mo, if present in a small proportion.
B. Settling Phase
  advantageously, phase A is followed by a period of settling in order to allow the droplets of metal to return to the copper bath by applying more moderate stirring than for phase A,
C. Oxidation Phase
  an oxidising phase making it possible to eliminate the iron present in the Cu—Ni (or Co) alloy; at the end of this oxidising phase, a proportion of the metal bath purified of iron in this manner is poured, but a sufficient heel is retained to begin treatment of a new charge of slag.

These 3 phases are carried out at temperature levels of approximately 1400 to 1500° C. and intense levels of stirring for phases A and C (40 to 150 liters of nitrogen per minute and per tonne of metal bath), which makes it possible to carry out heat exchange and reactions in short periods of time, of the order of 10 to 20 minutes per phase.

Carrying out a reducing phase and an oxidising phase in succession makes it possible to recover the copper, nickel and cobalt in a greatly iron-depleted copper bath and to volatilise and recover the other valuable metals either indirectly in the form of fine oxide particles by oxidation of the reduced metallic vapours, for example Zn and Pb, of phase A, or directly in the form of oxide particles, for example As, Mo, etc. in phase C, by means of a filter or another separator, such as a cyclone, etc.

EXAMPLES

Example 1

A first variant of a process according to the invention is illustrated in the test described below, carried out to treat a Cu—Fe—Ni slag, charged cold. It will be understood that treatment of a Cu smelter slag will proceed under similar conditions and with of similar results.

The test is carried out on an AC electric arc furnace with an effective power of 3 MW and a total capacity of 10 t, and involves treating the cold and thus solid slag of the following composition:

| Element/compound | Unit | Content |
| --- | --- | --- |
| Cu (as $Cu_2O$) | % | 8 |
| Fe (as FeO) | % | 35 |
| Ni (as NiO) | % | 0.8 |
| S | % | 0.1 |
| $SiO_2$ | % | 31 |
| CaO | % | 5 |
| $Al_2O_3$ | % | 4 |
| MgO | % | 3 |
| ZnO | % | 1.2 |

Before starting the actual treatment, 3 t of recovered copper, the analysis of which is stated in the following table, is charged into the furnace:

| Element/compound | Unit | Content |
| --- | --- | --- |
| Cu | % | 97.7 |
| Fe | % | ~1 |
| Ni | % | 0.1 |
| S | % | 0.1 |
| Si | % | 0.5 |
| Zn | % | <0.1 |
| Mn | % | 0.5 |

The copper charge is fused and adjusted to 1450° C., with nitrogen stirring by 3 stirring elements disposed in the bottom of the hearth, supplied by total flow rate total of 150 l/min, or 9 $Nm^3$/h.

Once the temperature of 1450° C. has been reached, charging of the Cu—Fe—Ni slag through an opening in the furnace roof is begun at a continuous flow rate of 4 t/h, while stirring is maintained at 150 l/min.

5 t of slag are charged in this manner and, at the end of charging, 500 kg of free lime, CaO, are added.

An hour and a half after the beginning of slag charging, a homogeneous slag is thus obtained and the reduction phase may be begun. This is carried out by injection of fine anthracite through a lance immersed in the slag at a rate of 10 kg/min for 10 minutes.

Ten minutes after the end of this injection, the flow rate of nitrogen stirring is reduced to ~15 l/min for 10 minutes, to promote settling of the metal droplets from the slag.

At this stage, samples of metal and slag are taken; analysis of these reveals the following results:

| Metal content % | Element/compound | Slag content % |
| --- | --- | --- |
| 96.7 | Cu | 0.3 |
| 1.9 | Fe (metal)/FeO (slag) | 45 |
| 1.2 | Ni | 0.05 |
| 0.1 | S | ~0.1 |
| <0.02 | Si (metal)/$SiO_2$ (slag) | 32 |
|  | CaO | 15 |
|  | $Al_2O_3$ | 4 |
|  | MgO | 3 |
| <0.01 | Zn (metal)/ZnO (slag) | <0.1 |
| <0.02 | Mn (metal)/MnO (slag) | 0.4 |

The quantity of slag obtained is 4.80 t; this being calculated by keeping a balance sheet for lime, which is present in a large quantity and is accurately measurable.

According to this analysis, recovery yields are as follows:
Cu: 96%
Ni: 94%

The metal bath is estimated at 3.48 t.

It will be noted that Si and Mn have virtually disappeared from the metal bath, which means that they have taken part in the reduction of Cu and Ni (and of the Fe which has passed into the metal).

This shows that reduction could also be achieved solely by metallic reducing agents of the Mn, Si or Al type. These metallic reducing agents have the advantage of a yield close to 100%, because, unlike carbon, they are readily dissolved in the copper bath, and therefore naturally distributed over the entire surface of the bath; furthermore the reduction reaction does not form gaseous CO, which avoids the risk of slag overflow due to uncontrolled foaming. On the other hand, metallic reducing agents are much more costly than carbon.

This greatly Cu- and Ni-depleted slag is then cleansed, and the process is resumed with a slag fusion phase and a reduction phase which are carried out in a similar manner to the described sequence; a metal bath is finally obtained which is enriched by ~1.1% Ni and the sequence may be repeated as many times as permitted by the capacity of the furnace, for example 3 times (4 sequences carried out in total), to obtain 5 t of metal.

Once the slag has been cleansed, but with a small proportion (for example 500 kg) being retained in the furnace, and before pouring the metal, an oxidising phase C may be carried out to eliminate the 2% of Fe contained in the metal bath.

To this end, intense stirring (150 l/min) is resumed and approximately 1.2 times the stoichiometric quantity of oxygen is injected through a lance immersed in the metal bath. Analysis of the metal reveals that the Fe content has been reduced to less than 0.05% in this manner, but it may noted that the Cu content of the slag has risen to 6%.

A proportion of the metal, for example 2 t of Cu—Ni alloy, is thus selectively poured via a spout device acting as a siphon, which makes it possible to retain the copper-rich slag in the furnace.

A slag fusion-reduction phase (phase A) may then be resumed, starting from the residual heel; the copper contained in this slag will be recovered during the reduction phase.

This therefore defines a treatment process for a Cu—Fe—Ni slag, producing a very pure Cu—Ni alloy (containing no iron) and recovering the copper and nickel with yields approaching 95%.

Example 2

The above mode of operation on a copper bath may be applied to the recovery of nickel and cobalt, which are highly miscible with copper. In the case of a Cu—Mo slag, molybdenum being very sparingly miscible with copper, a variant of the treatment is proposed with separation of the Mo by oxidation and volatilisation, oxidation being carried out as required depending on the content of molybdenum in the slag, for example after each reduction step.

A test on a slag of the composition stated in the table below, received in liquid form at 1200° C., is described below:

| Element/compound | Unit | Content |
|---|---|---|
| Cu (as $Cu_2O$) | % | 1.5 |
| Fe (as FeO)/$Fe_3O_4$) | % | ~45 |
| Mo (as $MoO_3$) | % | 0.5 |
| S | % | 0.5 |
| $SiO_2$ | % | ~26 |
| CaO | % | <1 |
| $Al_2O_3$ | % | 2 |

-continued

| Element/compound | Unit | Content |
|---|---|---|
| C | % | 1 |
| ZnO | % | 5 |

The treatment is carried out in an AC electric arc furnace with an effective power of 3 MW and total capacity of 10 t:

Before charging the liquid slag, a 3 t copper heel of the following composition is fused:

| Element/compound | Unit | Content |
|---|---|---|
| Cu | % | 97.7 |
| Fe | % | ~1 |
| Ni | % | 0.1 |
| S | % | 0.1 |
| Si | % | 0.5 |
| Zn | % | <0.1 |
| Mn | % | 0.5 |

This fusion is carried out at a flow rate of stirring nitrogen through the bottom of the hearth of 150 l/min.

Once this copper bath has been adjusted to 1450° C., 5 t of the above-defined slag are charged through a side channel in the furnace, with stirring at 150 l/min; at the end of slag charging, 500 kg of free lime, CaO, are added.

Once a homogeneous metal+slag bath at 1450° C. has been obtained, it is possible to begin the reduction phase by injection of fine anthracite through a lance immersed in the slag at a rate of 5 kg/min for 15 minutes.

At the end of this injection, the flow rate of nitrogen stirring is reduced to ~15 l/min for 15 minutes, to promote settling of the metal droplets from the slag.

After 15 minutes of settling with this "gentle" stirring, samples of metal and slag are taken which yield the following results:

| Metal content % | Element/compound | Slag content % |
|---|---|---|
| 97 | Cu (metal)/$Cu_2O$ (slag) | 0.3 |
| ~2 | Fe (metal)/$FeO_x$ (slag) | ~60 |
| 0.7 | Mo (metal)/$MoO_3$ (slag) | 0.08 |
| ~0.1 | S | ~0.5 |
| 0 | C | 0 |
| <0.1 | Si (metal)/$SiO_2$ (slag) | 26 |
|  | CaO | 11 |
|  | $Al_2O_3$ | 2 |
| <0.1 | Zn (metal)/ZnO (slag) | <0.1 |
| <0.02 | Mn (metal)/MnO (slag) | 0.5 |

The material balance sheets show that approximately 3.1 t of Mo-enriched copper and approximately 5 t of slag are obtained. The balance sheets for elemental Cu and Mo reveal recovery yields very close to 90% for Cu and for Mo.

It may furthermore be noted that Si and Mn have disappeared from the metal, they have obviously contributed to reducing the oxides of Cu and Mo (and of the Fe which has passed into the metal); likewise the zinc, which is virtually absent from the metal and the slag, is, as intended, recovered as oxide in the dust. Analysis of the dust selectively recovered during the slag process phase reveals nearly 75% ZnO, i.e. ~60% Zn.

If this slag treatment process were repeated with successive batches of liquid slag, recovery of the copper from this slag would be continued, but the problem of the very limited miscibility of Mo in Cu would be encountered.

It would therefore seem preferable to separate the Mo before moving on to the following charge of slag.

The characteristic of molybdenum oxide of being highly volatile ($MoO_3$ vaporises at 1150° C.) is exploited to this end and the following procedure used:

- the Mo- and Cu-depleted slag is cleansed as thoroughly as possible (so as to retain approximately 500 kg of residual slag)
- oxygen is injected through a refractory lance immersed in the metal bath at a flow rate of 5 $Nm^3$/min, in repeated 2 min injection phases with a sample being taken at each step.
- the dust released during this oxidation phase is selectively recovered in new filter bag.

It will be noted that, in order to extract the Mo, it is first necessary to oxidise virtually all the iron in the metal (down to 0.05% Fe); the content of Mo is reduced to 0.07% once 30 $Nm^3$ oxygen have been injected, namely 1.5 times the stoichiometric quantity of oxygen for oxidising the Fe and Mo. Analysis of the resultant slag reveals that its copper content has risen to nearly 10%, which largely explains the excess of oxygen passed through.

The released Mo oxide is indeed recovered in the specialised filter bag, with an Mo content approaching 50%, namely nearly 80% $MoO_3$ oxide.

After this selective Mo extraction phase, operations are continued by charging a new batch of 5 t of Cu—Mo slag onto the resultant metal bath in order to recover the Cu and Mo into the metal bath and to separate Mo therefrom in an oxidation phase.

This test therefore illustrates a process for recovering the Cu and Mo from a slag with the following yields:

Cu 90% recovered into the copper bath

Mo approximately 80% recovered as an $MoO_3$ oxide dust.

The invention claimed is:

1. A process for recovering non-ferrous metals from metallurgical residues containing these non-ferrous metals at an oxidation state of greater than or equal to zero, in an alternating current type plasma arc electric furnace comprising a plurality of electrodes, containing a liquid copper heel, covered by a fluid slag, said process comprising at least one fusion-reduction phase A, comprising the following steps:

A1 charging metallurgical residues comprising non-ferrous metals onto the heel contained in the plasma arc electric furnace, A2 fusion of the metallurgical residues in the fluid slag at a slag/copper bath interface, A3 reduction of at least the non-ferrous metals to oxidation state zero, and A4 intense stirring of the liquid copper heel by injection of inert gas so as to avoid crust formation and to accelerate the reduction reaction and to cause copper-miscible non-ferrous metals to pass into the copper heel.

2. A process according to claim 1, wherein the reduction A3 is carried out in the presence of carbon.

3. A process according to claim 2, wherein the reduction A3 is carried out in the presence of quicklime CaO.

4. A process according to claim 3, wherein the intense stirring of the heel A4 is carried out by injection of inert gas through the hearth of the electric arc furnace at a flow rate of between 40 l/min·t and 150 l/min·t.

5. A process according to claim 4, further comprising a settling phase B subsequent to the at least one fusion-reduction phase comprising a moderate stirring B1 which promotes settling of a plurality of metal droplets from the slag into the heel, followed by removal B2 of at least a proportion of the slag from the furnace.

6. A process according to claim 5, wherein the moderate stirring of the heel in step B1 is carried out by injection of inert gas through the hearth of the electric arc furnace at a flow rate of between 2 l/min·t and 20 l/min·t.

7. A process according to claim 5, further including a recovery of volatile heavy metals, wherein the volatile heavy metal compounds carried away in fumes during phase A are recovered by means of separators.

8. A process according to claim 7, wherein the volatile heavy metal compounds carried away in the fumes during phase B are recovered by means of separators.

9. A process according to claim 5, wherein the metallurgical residues also contain iron, further including an elimination of iron from the copper bath and an elimination of metals more highly oxidizable than iron from the copper bath, wherein said process further includes at least one subsequent oxidation phase C involving oxidation of the iron and of the metals more highly oxidizable than iron, manganese or aluminium, in the copper bath by injection of oxygen into the copper bath while maintaining intense stirring from beneath.

10. A process according to claim 9, further including a recovery of volatile non-ferrous metals in oxidized form wherein the volatile non-ferrous metal compounds in oxidized form carried away in the fumes during the oxidation phase C are recovered by means of separators.

11. A process according to claim 10, further including a selective recovery of a molybdenum oxide concentrate, wherein the oxidation phase C is carried out after removal B2 of at least a proportion of the slag and with a quantity of oxygen amounting to 1.2 to 1.8 times the stoichiometric quantity for oxidation of the iron and molybdenum contained in the copper bath, and in that the molybdenum oxide carried away in the fumes is recovered by means of separators.

12. A process according to claim 10, wherein a proportion of the copper bath is removed from the furnace and the slag is recycled to a subsequent fusion-reduction phase A.

13. A process according to claim 1, wherein the intense stirring of the heel A4 is carried out by injection of inert gas through the hearth of the electric arc furnace at a flow rate of between 40 l/min·t and 150 l/min·t.

14. A process according to claim 1, further comprising a settling phase B subsequent to the at least one fusion-reduction phase comprising a moderate stirring B1 which promotes settling of a plurality of metal droplets from the slag into the heel, followed by removal B2 of at least a proportion of the slag from the furnace.

15. A process according to claim 1, wherein treatment temperatures are between 1400 and 1500° C.

16. A process according to claim 1, wherein the metallurgical residues are charged by gravity.

17. A process according to claim 1, wherein the metallurgical residues are charged into a region located between the electrodes of the plasma arc electric furnace.

18. A process according to claim 1, wherein non-ferrous metals includes copper, nickel, and cobalt.

* * * * *